(12) United States Patent
Johnson

(10) Patent No.: US 9,834,067 B1
(45) Date of Patent: Dec. 5, 2017

(54) VEHICLE SUNSHADE

(71) Applicant: Jermaine Johnson, Greenville, SC (US)

(72) Inventor: Jermaine Johnson, Greenville, SC (US)

(*) Notice: Subject to any disclaimer, the term of this patent is extended or adjusted under 35 U.S.C. 154(b) by 0 days.

(21) Appl. No.: 15/162,808

(22) Filed: May 24, 2016

(51) Int. Cl.
*B60J 1/20* (2006.01)
*B60J 3/02* (2006.01)
*B60J 11/02* (2006.01)

(52) U.S. Cl.
CPC .......... *B60J 3/0213* (2013.01); *B60J 11/025* (2013.01)

(58) Field of Classification Search
CPC .. B60H 11/025; B60H 1/2013; B60H 1/2066; B60H 1/2069; B60H 1/2075; B60H 1/2077
USPC ............................................... 160/268.1, 277
See application file for complete search history.

(56) References Cited

U.S. PATENT DOCUMENTS

| | | | |
|---|---|---|---|
| 1,748,031 A * | 2/1930 | Wiener | B60J 7/1295 296/98 |
| 2,821,248 A * | 1/1958 | Irvine | B60J 11/08 160/370.21 |
| 3,732,912 A * | 5/1973 | Collet | E04F 10/04 160/55 |
| 4,432,581 A * | 2/1984 | Guma | B60J 11/02 135/88.07 |
| 5,064,238 A * | 11/1991 | Mohtasham | B60J 1/2063 296/97.12 |
| 5,078,446 A * | 1/1992 | Walter | B60J 11/02 224/331 |
| 5,098,149 A | 3/1992 | Lee | |
| 5,267,768 A * | 12/1993 | Tsai | B60J 3/02 296/97.11 |
| 5,560,668 A | 10/1996 | Li | |
| 5,653,278 A | 8/1997 | Cheng | |
| D393,560 S | 4/1998 | Adams | |
| 6,460,593 B1 * | 10/2002 | Floyd | B60J 1/205 160/250 |
| 6,536,829 B2 | 3/2003 | Schlecht | |
| 6,682,123 B2 * | 1/2004 | Burks | B60J 11/02 160/370.22 |
| 6,948,766 B1 * | 9/2005 | Capote | B60J 5/0494 296/152 |
| 7,216,917 B2 | 5/2007 | Tadakamalla | |
| 2007/0029058 A1 | 2/2007 | Lin | |

FOREIGN PATENT DOCUMENTS

WO WO2006099212 A2 9/2006
WO WO2009084771 A1 7/2009

* cited by examiner

*Primary Examiner* — Katherine W Mitchell
*Assistant Examiner* — Abe Massad

(57) ABSTRACT

The vehicle sunshade is adapted for use as a sunshade within a vehicle. The vehicle sunshade is a retractable shade that is mounted in the vehicle where front windshield meets the roof of the vehicle. The shade contained on the retractable shade is adapted to fit around the rearview mirror mounted on the windshield of the vehicle and to extend laterally to partially block sunlight from passing through the front windows. The vehicle sunshade comprises a roller, a shade, a first clip, and a second clip.

8 Claims, 5 Drawing Sheets

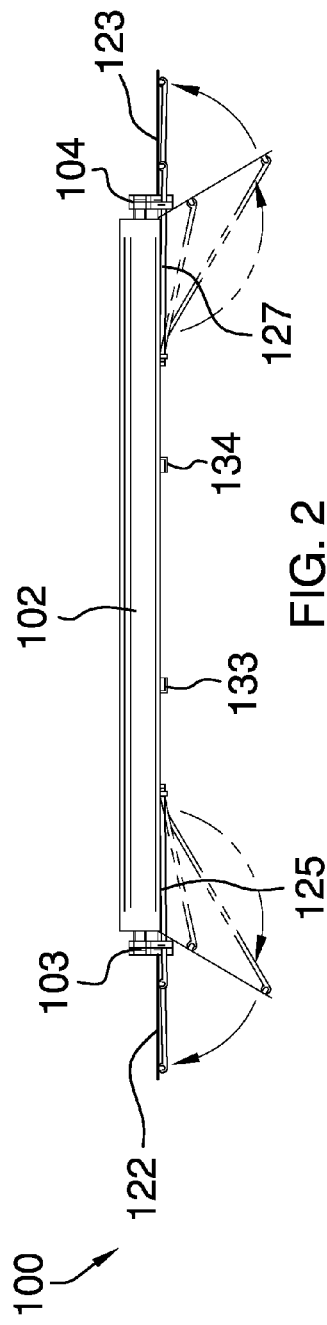
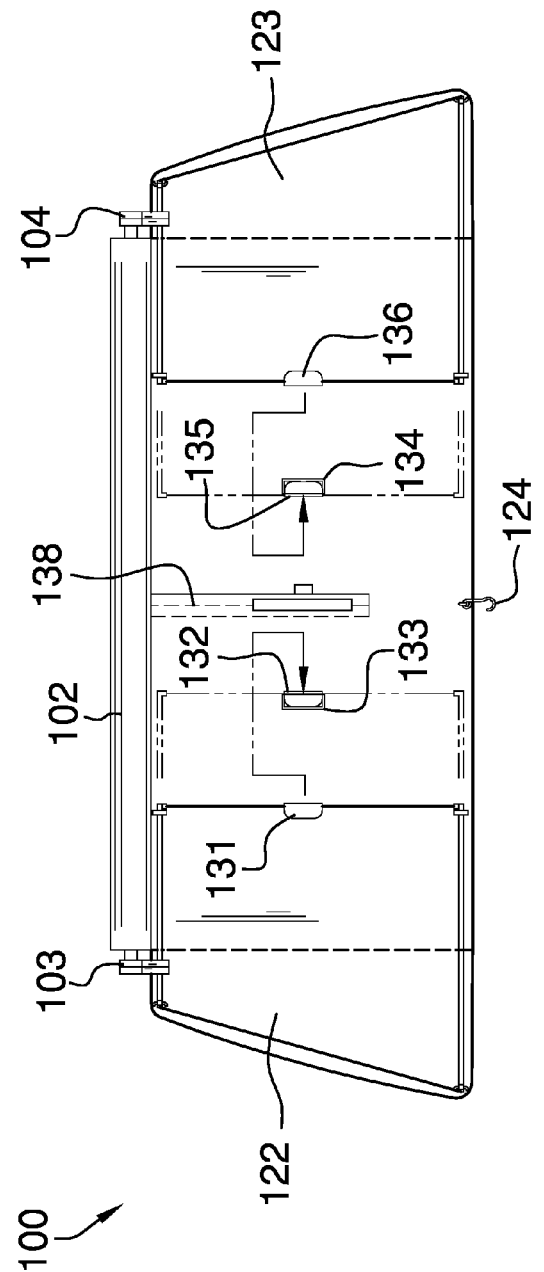

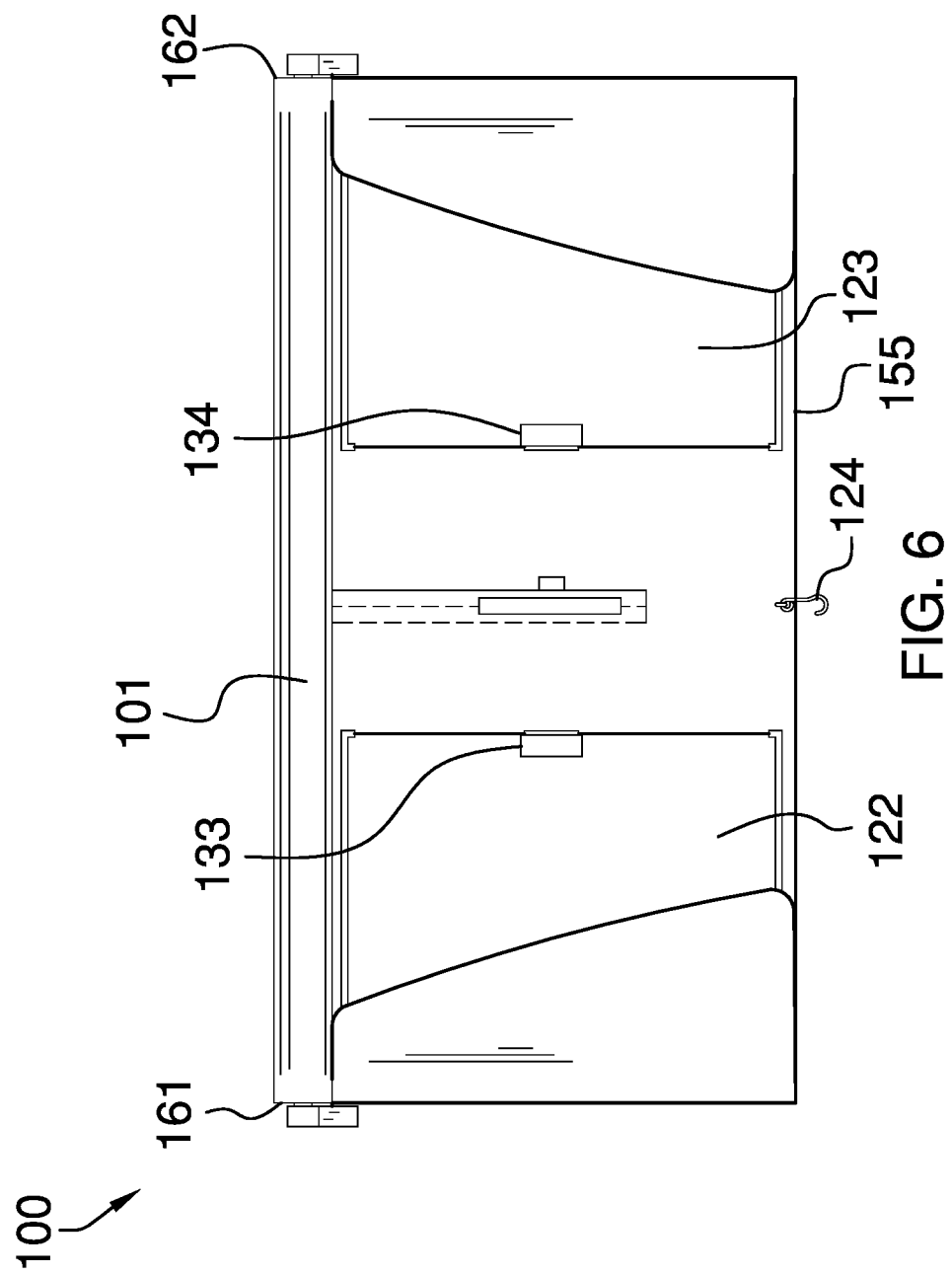

US 9,834,067 B1

VEHICLE SUNSHADE

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of protective covers for windows windshields and doors, more specifically, a sunshade configured for use with vehicles.

SUMMARY OF INVENTION

The vehicle sunshade is adapted for use as a sunshade within a vehicle. The vehicle sunshade is a retractable shade that is mounted in the vehicle where front windshield meets the roof of the vehicle. The shade contained on the retractable shade is adapted to fit around the rearview mirror mounted on the windshield of the vehicle and to extend laterally to partially block sunlight from passing through the front windows.

These together with additional objects, features and advantages of the vehicle sunshade will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle sunshade in detail, it is to be understood that the vehicle sunshade is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle sunshade.

It is therefore important that the claims be regarded as including such equivalent construction insofar as they do not depart from the spirit and scope of the vehicle sunshade. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a top view of an embodiment of the disclosure.
FIG. 3 is a front view of an embodiment of the disclosure.
FIG. 6 is a detail view of an embodiment of the disclosure.

DETAILED DESCRIPTION OF THE EMBODIMENT

Figure 1:
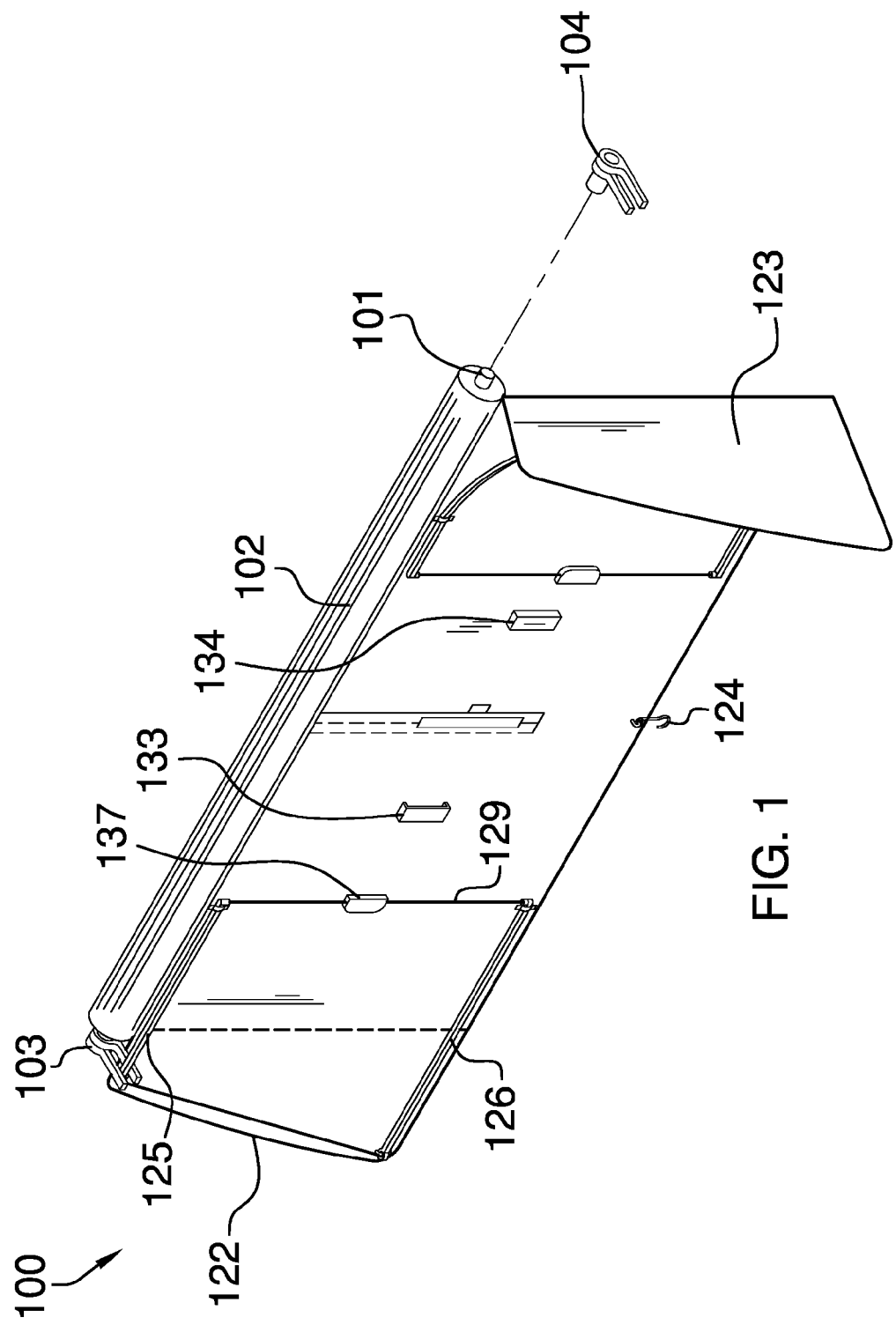
FIG. 1 is a perspective view of an embodiment of the disclosure.
Figure 4:
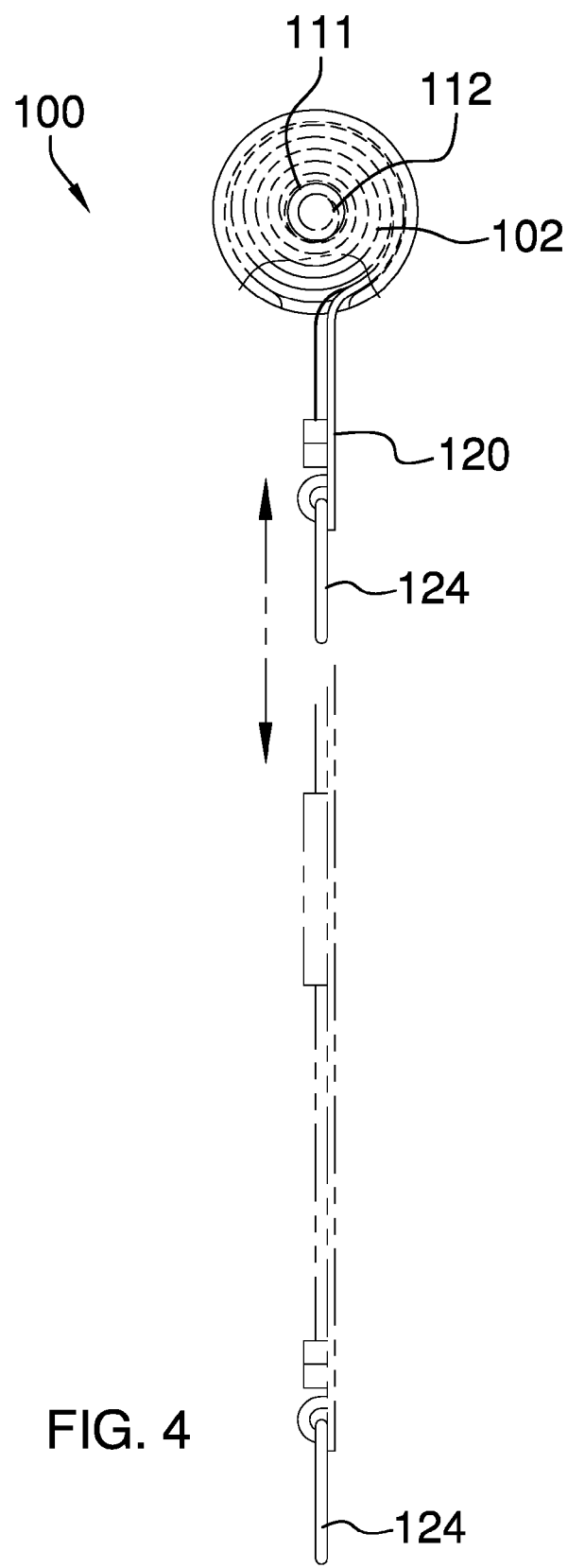
FIG. 4 is a side view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 6. The vehicle sunshade 100 (hereinafter invention) comprises a roller 101, a shade 102, a first clip 103, and a second clip 104. The vehicle sunshade 100 is adapted for use with a vehicle 141.

The roller 101 is a commercially available retractable shade roller that further comprises a bar 111 and a retracting spring 112. The roller 101 is further defined with a first end 161 and a second end 162. The bar 111 is a cylindrical object around which the shade 102 is wrapped for storage. To extend the shade 102, the shade 102 is rolled off the bar 111. To retract the shade 102, the shade 102 is rolled back onto the bar 111. The retracting spring 112 is a device that is attached to the bar 111 that stores rotational energy as the shade 102 is extended from the bar 111. When the shade 102 is retracted back on to the bar 111, the retracting spring 112 uses the stored rotational energy to assist in rerolling the shade 102 onto the bar 111. Rollers with retracting springs are commercially available. The design and use of retracting springs is well known and documented in the mechanical arts.

The first clip 103 attaches to the first end 161 of the roller 101. The second clip 104 attaches to the second end 162 of the roller 101. The first clip 103 and the second clip 104 are pivots that are adapted to mount into mounting brackets that are installed into the vehicle 141. The mounting brackets are installed such that the roller 101 is mounted in the vehicle where the windshield 142 of the vehicle 141 meets the roof 146 of the vehicle 141. The first clip 103 and the second clip 104 are installed such that the roller 101 can freely roll to extend and retract the shade 102. Pivots and mounting brackets are commercially available. The design and use of pivots and mounting brackets are well known and documented in the mechanical arts.

The shade 102 is a sheeting that blocks sunlight from entering the vehicle 141 through the windshield 142, front driver window 144, and front passenger window 145. The shade 102 comprises a protective sheeting 120, a holding hook 124, a first push rod 125, a second push rod 126, a third push rod 127, a fourth push rod 128, a first cord 129, a second cord 130, a plurality of tab pockets 137, and a shade slot 138. The protective sheeting 120 further comprises a body 121, a first wing 122, and a second wing 123. In the first potential embodiment of the disclosure, the plurality of tab pockets 137 further comprises a first tab 131, a second tab 132, a third tab 133, a fourth tab 134, a fifth tab 135, and a sixth tab 136.

The protective sheeting 120 is cut as a single piece from plastic sheeting. The protective sheeting 120 is cut in a T shape that is broken down into the body 121, the first wing 122, and the second wing 123. The body 121 is further defined with a first edge 151, a second edge 152, a fifth edge 155, and an eighth edge 158. The first wing 122 is further defined with a sixth edge 156 and a seventh edge 157. The second wing 123 is further defined with a third edge 153 and a fourth edge 154. The first edge 151 attaches to the roller 101. When viewed such that the first wing 122 is on the left side of the roller 101 the position of the sides of the protective sheeting 120 in clockwise order from the first edge 151 are the second edge 152, the third edge 153, the fourth edge 154, the fifth edge 155, the sixth edge 156, the seventh edge 157, and the eighth edge 158.

The first push rod 125 is a shaft that is further defined with a third end 163 and a fourth end 164. The second push rod is a shaft that is further defined with a fifth end 165 and a sixth end 166. The third push rod 127 is a shaft that is further defined with a seventh end 167 and an eighth end 168. The fourth push rod 128 is a shaft that is further defined with a ninth end 169 and a tenth end 170. The third end 163 of the first push rod 125 is attached to the first wing 122 next to the corner defined by the sixth edge 156 and the seventh edge 157 such that the first push rod 125 lies on the protective sheeting 120 parallel to the fifth edge 155. The fifth end 165 of the second push rod 126 is attached to the first wing 122 next to the corner defined by the fifth edge 155 and the sixth edge 156 such that the second push rod 126 lies on the protective sheeting 120 parallel to the fifth edge 155.

The eighth end 168 of the third push rod 127 is attached to the second wing 123 next to the corner defined by the third edge 153 and the fourth edge 154 such that the third push rod 127 lies on the protective sheeting 120 parallel to the fifth edge 155. The tenth end 170 of the fourth push rod 128 is attached to the second wing 123 next to the corner defined by the fourth edge 154 and the fifth edge 155 such that the fourth push rod 128 lies on the protective sheeting 120 parallel to the fifth edge 155. The fourth end 164 of the first push rod 125 and the sixth end 166 of the second push rod 126 are joined using the first cord 129. The seventh end 167 of the third push rod 127 and the ninth end 169 of the fourth push rod 128 are joined using the second cord 130. The use of the first push rod 125, the second push rod 126, the third push rod 127 and the fourth push rod 128 are explained elsewhere in this disclosure.

Figure 5:
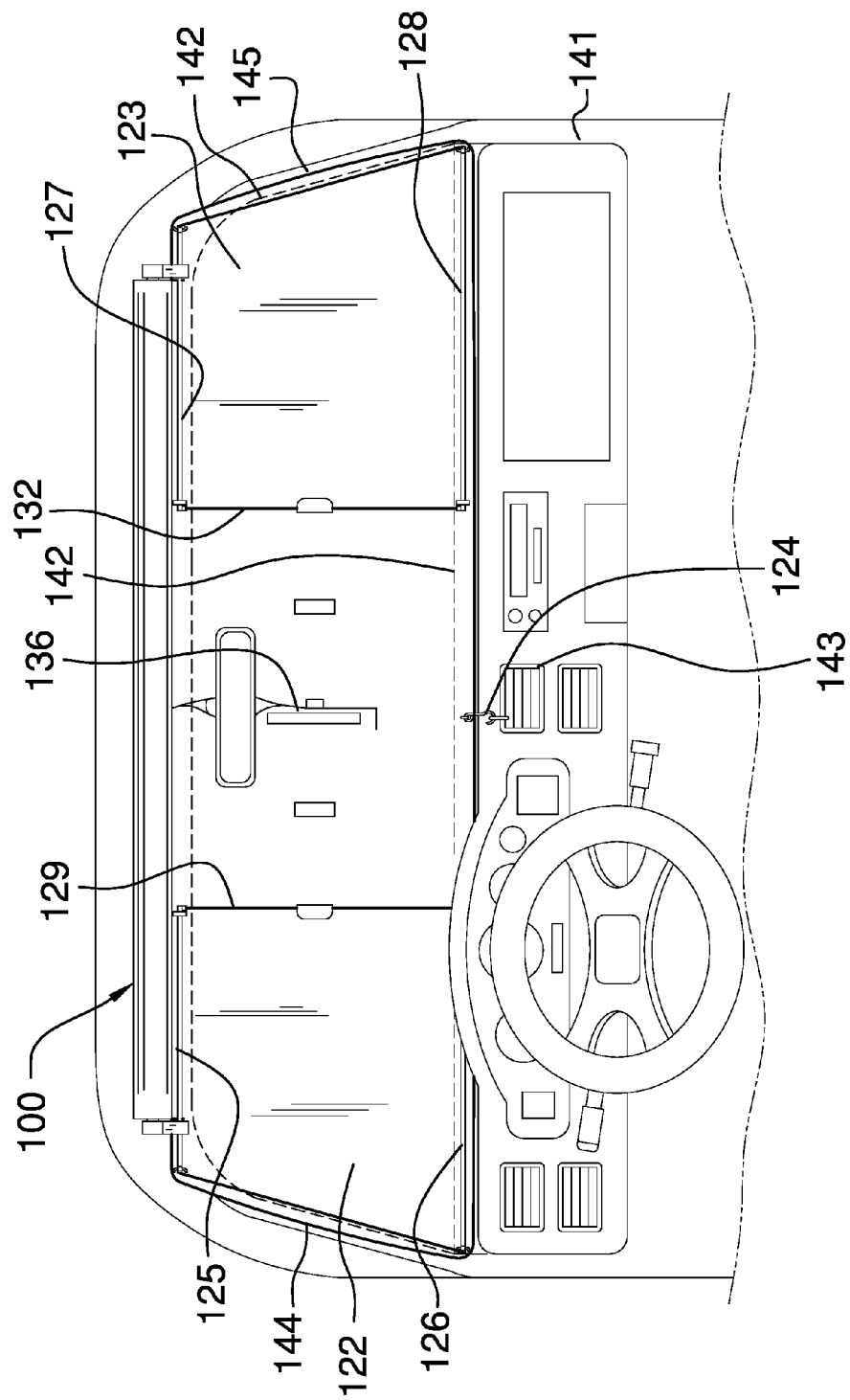
FIG. 5 is an in use view of an embodiment of the disclosure.

As shown most clearly in FIGS. 3 and 5, a holding hook 124 is attached to the protective sheeting 120 at the center of the fifth edge 155. The holding hook 124 attaches the protective sheeting 120 to the dashboard 143 of the vehicle 141 to insure that the shade 102 remains in position after it is deployed.

As shown most clearly in FIGS. 3 and 5, a holding hook 124 is attached to the protective sheeting 120 at the center of the fifth edge 155. The holding hook 124 attaches the protective sheeting 120 to the dashboard 143 of the vehicle 141 to insure that the shade 102 remains in position after it is deployed. The shade slot 138 is a slit that is formed in the protective sheeting 120 along a hypothetical line that is formed between the center of the first edge 151 and the center of the fifth edge 155 of the shade 102. The purpose of the shade slot 138 is to allow the rearview mirror 147 to be inserted through the shade slot 138 when the shade 102 is deployed.

As shown most clearly in FIG. 5, once the first cord 129 is locked in position the first push rod 125, the second push rod 126 and the first cord 129 form a support that holds the first wing 122 in position. Once the second cord 130 is locked in position the third push rod 127, the fourth push rod 128 and the second cord 130 form a support that holds the second wing 123 in position.

The invention 100 is installed as described elsewhere in this disclosure. As shown in FIG. 5, to deploy the shade 102, the holding hook 124 is pulled away from the roller 101 until the holding hook 124 can be attached to the dashboard 143. The first wing 122 is rotated away from the body 121 towards the front driver window 144. Once the first wing 122 is positioned, the position is locked by securing the first cord 129 to a tab pocket selected from the plurality of tab pockets 137. The second wing 123 is rotated away from the body 121 towards the front passenger window 145. Once the second wing 123 is positioned, the position is locked by securing the second cord 130 to a tab pocket selected from the plurality of tab pockets 137.

To retract the shade 102, the first cord 129 is released from the tab pocket selected from the plurality of tab pockets 137 and the second cord 130 is released from tab pocket selected from the plurality of tab pockets 137. The first wing 122 is folded on top of the body 121 such that the fold line formed by the first wing 122 is aligned with the eighth edge 158. The second wing 123 is folded on top of the body 121 such that the fold line formed by the second wing 123 is aligned with the second edge 152. The retracting spring 112 is then released such that the shade 102 is rolled upon the roller 101.

All the component discussed in this disclosure are commercially available.

The following definitions were used in this disclosure:

Vehicle: As used in this disclosure, an vehicle is a road vehicle that is powered by an internal combustion engine. This definition is specifically intended to include vehicles generally referred to as pickup trucks.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Cord: As used in this disclosure, a cord is a string or small rope formed by two or more yarns that are twisted or braided together.

Pivot: As used in this disclosure, a pivot is a rod or shaft around which an object rotates or swings.

Sheeting: As used in this disclosure, sheeting is a material, such as cloth or plastic, in the form of a thin flexible layer or layers that is used to cover something.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A sunshade comprising:

a roller, a shade, a first clip, and a second clip;

wherein the sunshade is adapted for use with a vehicle;

wherein the sunshade is retractable;

wherein the sunshade further comprises a holding hook that is adapted to mount the sunshade to a dashboard of said vehicle;

wherein the sunshade further comprises a plurality of foldout portions;

wherein the roller further comprises a bar and a retracting spring;

wherein the roller is further defined with a first end and a second end;

wherein the shade is wrapped around the bar;

wherein the retracting spring is a device that is attached to the bar that stores rotational energy;

wherein the first clip attaches to the first end of the roller;

wherein the second clip attaches to the second end of the roller;

wherein the first clip is a pivot that is installed such that the roller can freely rotate;

wherein the second clip is a pivot that is installed such that the roller can freely rotate;

wherein the shade comprises a protective sheeting, a first push rod, a second push rod, a third push rod, a fourth push rod, a first cord, a second cord, a plurality of tab pockets, and a shade slot;

wherein the protective sheeting further comprises a body, a first wing, and a second wing;

wherein the body is further defined with a first edge, a second edge, a fifth edge, and an eighth edge;

wherein the first wing is further defined with a sixth edge and a seventh edge;

wherein the second wing is further defined with a third edge and a fourth edge;

wherein the first edge attaches to the roller;

wherein the first push rod is a shaft that is further defined with a third end and a fourth end;

wherein the second push rod is a shaft that is further defined with a fifth end and a sixth end;

wherein the third push rod is a shaft that is further defined with a seventh end and an eighth end;

wherein the fourth push rod is a shaft that is further defined with a ninth end and a tenth end;

wherein the third end of the first push rod is attached to the first wing;

wherein the fifth end of the second push rod is attached to the first wing;

wherein the eighth end of the third push rod is attached to the second wing;

wherein the tenth end of the fourth push rod is attached to the second wing;

wherein the fourth end of the first push rod and the sixth end of the second push rod are joined using the first cord;

wherein the seventh end of the third push rod and the ninth end of the fourth push rod are joined using the second cord;

wherein the first and second wings are configured to move from a folded position overlapping the body to an extended position extending from the body, wherein the first and second push rods support the first wing in the extended position and the third and fourth push rods support the second wing in the extended position.

2. The sunshade according to claim 1 wherein the holding hook is attached to the protective sheeting at the center of the fifth edge.

3. The sunshade according to claim 2 wherein the holding hook attaches the protective sheeting to the dashboard of the vehicle.

4. The sunshade according to claim 3 wherein the shade slot is a slit that is formed in the protective sheeting.

5. The sunshade according to claim 4 wherein the shade slot is sized to allow a rearview mirror to be inserted through the shade slot.

6. The sunshade according to claim 5 wherein each of the plurality of tab pockets further comprises a first arm and a second arm.

7. The sunshade according to claim 6 wherein the first arm projects perpendicularly away from the protective sheeting;

wherein the second arm projects perpendicularly away from the protective sheeting.

8. The sunshade according to claim 7 wherein when the first cord or the second cord is inserted between the first arm and the second arm of a tab pocket selected from the plurality of tab pockets, a spring action of the first arm and a second arm serve to trap the first cord or the second cord and lock it in position.

\* \* \* \* \*